US008523142B2

(12) United States Patent
Mann

(10) Patent No.: US 8,523,142 B2
(45) Date of Patent: Sep. 3, 2013

(54) ACTUATOR WITH PRE-DETERMINED FAILURE MODE

(75) Inventor: Anthony W Mann, Aberdeen (GB)

(73) Assignee: Aker Subsea Limited, Berkshire (GB)

( * ) Notice: Subject to any disclaimer, the term of this patent is extended or adjusted under 35 U.S.C. 154(b) by 417 days.

(21) Appl. No.: 12/912,210

(22) Filed: Oct. 26, 2010

(65) Prior Publication Data

US 2011/0114861 A1    May 19, 2011

(30) Foreign Application Priority Data

Nov. 19, 2009   (GB) .................................. 0920239.1

(51) Int. Cl.
*F16K 31/00* (2006.01)
*F16K 31/02* (2006.01)
*F16K 31/44* (2006.01)

(52) U.S. Cl.
USPC .......... 251/129.11; 251/69; 251/74; 251/279; 137/624.27

(58) Field of Classification Search
USPC ...... 251/68, 69, 129.11, 74, 279; 137/624.27
See application file for complete search history.

(56) References Cited

U.S. PATENT DOCUMENTS

| | | | |
|---|---|---|---|
| 2,933,939 A | | 4/1960 | Brandt et al. |
| 3,518,891 A | * | 7/1970 | Denkowski .................. 74/89.25 |
| 3,777,516 A | | 12/1973 | Tigges |
| 5,886,603 A | * | 3/1999 | Powell .......................... 335/164 |
| 6,488,260 B1 | * | 12/2002 | Dietz ........................ 251/129.13 |
| 2004/0069357 A1 | * | 4/2004 | Ellacott et al. ........... 137/624.27 |

FOREIGN PATENT DOCUMENTS

| | | |
|---|---|---|
| GB | 1 270 240 | 4/1972 |
| WO | WO 00/77289 | 12/2000 |
| WO | WO 2008/102067 | 8/2008 |

OTHER PUBLICATIONS

Search Report for GB 0920239.1 dated Mar. 16, 2010.

* cited by examiner

*Primary Examiner* — John K Fristoe, Jr.
*Assistant Examiner* — Kevin Barss
(74) *Attorney, Agent, or Firm* — Nixon & Vanderhye PC

(57) ABSTRACT

An actuator with a predetermined failure mode includes two carriers which are each moveable in a common direction. A detent is engageable to couple the carriers to move in unison. An electrically operated actuating device causes extension of the toggle linkage to operate the detent and collapse of the toggle linkage when de-energized. There is a prime mover for the first carrier and a return mover for causing return movement of the second carrier on the release of the detent. In an example, the detent includes a pivoted arm disposed on the first carrier and positioned to engage a part of the second carrier; and the toggle linkage includes a pair of relatively pivoted links connected between a pivot on the first carrier and a pivot on the arm.

12 Claims, 2 Drawing Sheets

ACTUATOR WITH PRE-DETERMINED FAILURE MODE

REFERENCE TO RELATED APPLICATION

This application claims priority from GB patent application No. 0920239.1 filed 19 Nov. 2009, the subject matter of which application is hereby incorporated by reference.

TECHNICAL FIELD

This invention relates to actuators, and particularly to electrically or hydraulically-operated actuators for operating devices such as hydraulic control valves. The invention is particularly but not exclusively intended for use in subsea modules.

BACKGROUND

Control valves and other devices which are operated by such actuators control the flow of control fluids, at high pressures, or production fluids such as liquid or gaseous hydrocarbons. It is particularly important that in the event of failure of the prime mover of the actuator, such as for example its power supply, the actuator should remain in or revert to a predetermined mode in which (usually) the controlled device such as a control valve is closed. The invention therefore concerns a reliable and comparatively simple actuator of this kind.

SUMMARY

The exemplary embodiment particularly provides an actuator comprising a first carrier and a second carrier which are each moveable in a common direction. A detent is engageable to couple the carriers to move in unison. A toggle linkage is extensible to operate the detent and collapsible to release the detent, to allow movement of the second carrier relative to the first carrier. An electrically-operated actuating device causes extension of the toggle linkage when energized and effects collapse of the toggle linkage when de-energized. The actuator includes an operating member carried by the second carrier; a prime mover for the first carrier; and a return mover for causing return movement of the second carrier on the release of the detent.

The detent preferably comprises a pivoted arm disposed on the first carrier and positioned to engage a part of the second carrier. The toggle linkage may comprise a pair of relatively pivoted links connected between a pivot on the first carrier and a pivot on the said arm.

The electrically-operated actuating device may comprise a solenoid actuator which is coupled to a pivot between the links and has a restoring bias,

DETAILED DESCRIPTION OF EXEMPLARY EMBODIMENTS

Figure 1:
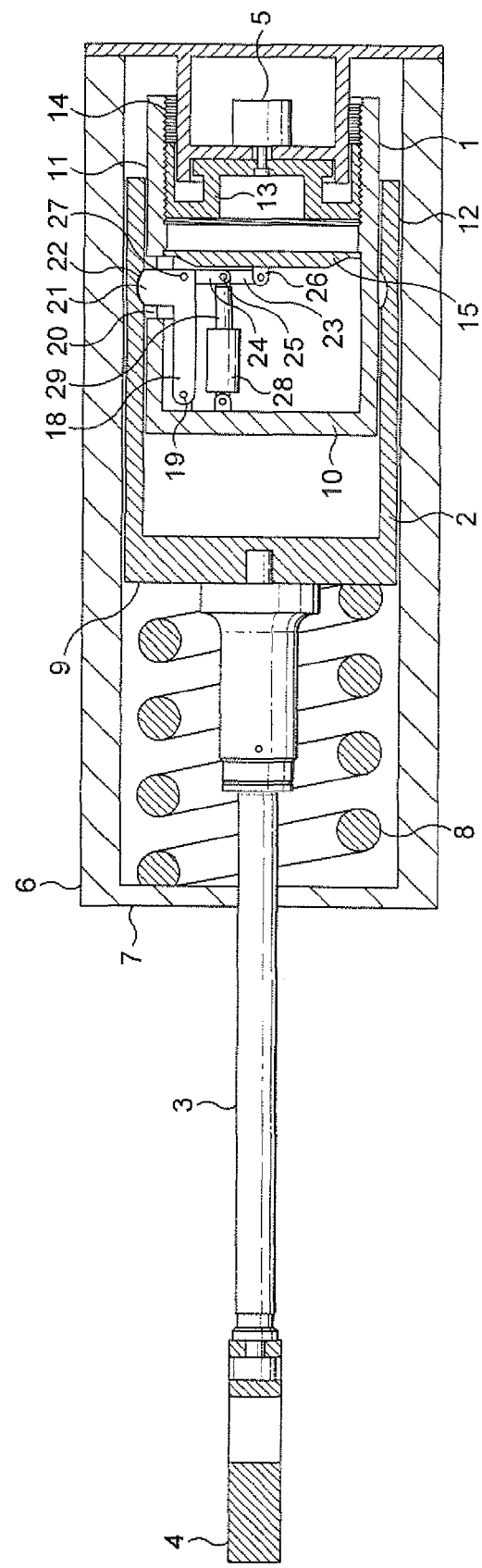
FIG. 1 shows in longitudinal section an actuator according to one embodiment of the invention, shown in an active state.

The principal parts of the exemplary actuator are a first carrier 1, adapted to be moved by a prime mover, and a second carrier 2, which is adapted to actuate a device such as a control valve. In this example a stem 3 extends from the carrier 2 and carries at its remote end a valve gate 4 which has a transverse aperture which can be moved into and out of alignment with a main passageway in the body of the valve, of which the rest is omitted for convenience.

In this example the prime mover for the carrier 1 is an electric motor 5.

The prime mover 5 and the carriers 1 and 2 are in this example contained within a rigid housing 6, through the top wall 7 of which the stem 3 extends to the control valve. In practice the actuating direction of movement of the carriers 1 and 2 is vertically upwards and will be described as such, that being preferred when the actuator is disposed in a subsea module associated with a subsea well; but the invention is not limited to such a direction.

The second carrier 2 and thereby the operating member constituted by the stem 3 is subject to a restoring force provided by a return mover 8. In this example the return mover 8 is constituted by a compression spring disposed to act on the second carrier and thereby the stem and located between the top end wall 9 of the second carrier 2 and the top end wall 7 of the housing 2.

However, the prime mover 5 may in principle be constituted by any suitable hydraulic, electric, or mechanical device. The return mover 8 may be constituted by any suitable means of which the operation is independent of the prime mover and any power supply to it.

The carriers 1 and 2 can be coupled for conjoint movement by a detent to be described. When they are so coupled the action of the prime mover 5 causes advancing movement of the stem 3. On release of the detent, the return mover 8 can move the second carrier 2 in reverse to cause retracting movement of the stem 3. It may be noted that there is a lost motion relationship between the carriers, whereby the first carrier 1 can be driven upwardly to its maximum extent, and nevertheless downward movement of the second carrier 2 does not require operation of the prime mover 5 provided that the detent has been released.

In particular the first carrier 1 has the form of a cylinder closed at its top end by an end wall 10 and having a side wall 11. The second carrier 2 is also in the form of a cylinder, defined by the top end wall 9 and a side wall 12. The first carrier 1 is partly contained within the second carrier and the respective side walls 11 and 12 overlap in the direction of movement of the carriers. The second carrier moves within and is guided by the cylindrical housing 6.

In this example, the prime mover 5, i.e. the electric motor, drives a worm wheel 13 which engages a screw thread 14 on the inside of the cylindrical side wall 11 of the first carrier 1. Rotation of the motor 5 moves the first carrier 1 up, potentially to advance the stem 3, and down, ready for another actuating stroke.

Within the first carrier 1 are a detent mechanism and a solenoid-controlled toggle mechanism.

The detent mechanism comprises an arm 18 which at its top end is mounted on a pivot 19 within the first carrier 1 and close to the top wall 10 thereof. The arm extends out of the first carrier through a port 20 in the side wall 11 and the lower end 21 of the arm can engage a slot 22 in the inner face of the side wall 12 of the second carrier 2.

The toggle mechanism comprises two links 23, 24 of which the inner and adjacent ends are connected together at a pivot 25. One of the links, i.e., link 23, is rotatable about a pivot 26 fixed in the first carrier 1 and is, in particular, disposed on a transverse plate 15 which is fixed in the carrier 1 and separates the compartment containing a solenoid actuator 28 and the toggle linkage from the compartment containing the screw-threading 14. The other link 24 is rotatable about a pivot 27 provided at the elbow of the bent arm 18. The solenoid actuator 28 is fixed in the carrier 1, being pivotally mounted on and dependant from the top end wall 10. The armature 29 of the solenoid actuator 28 is connected to the pivot 25 which connects the inner ends of the links 23 and 24. The armature of the solenoid actuator has, as is customary, a restoring bias (not shown) such as a mechanical spring, for causing retraction of the armature 29 on the de-energization of the solenoid.

Engagement of the detent arm 18 accordingly requires the toggle links 23 and 24 to provide a maximum span between the fixed pivot 26 on the carrier 1 and the pivot 27 on the arm 18. The maintenance of the maximum span requires the continued energization of the solenoid 28.

The actuator in its operational state is shown in FIG. 1. The solenoid 28 is energized; the motor 5 drives the first carrier 1 in the direction required to cause the stem 3 to move the valve slider 4 and the second carrier 2 moves, by virtue of the engagement of the detent, in unison with the first carrier 1 to advance the stem 3.

Figure 2:
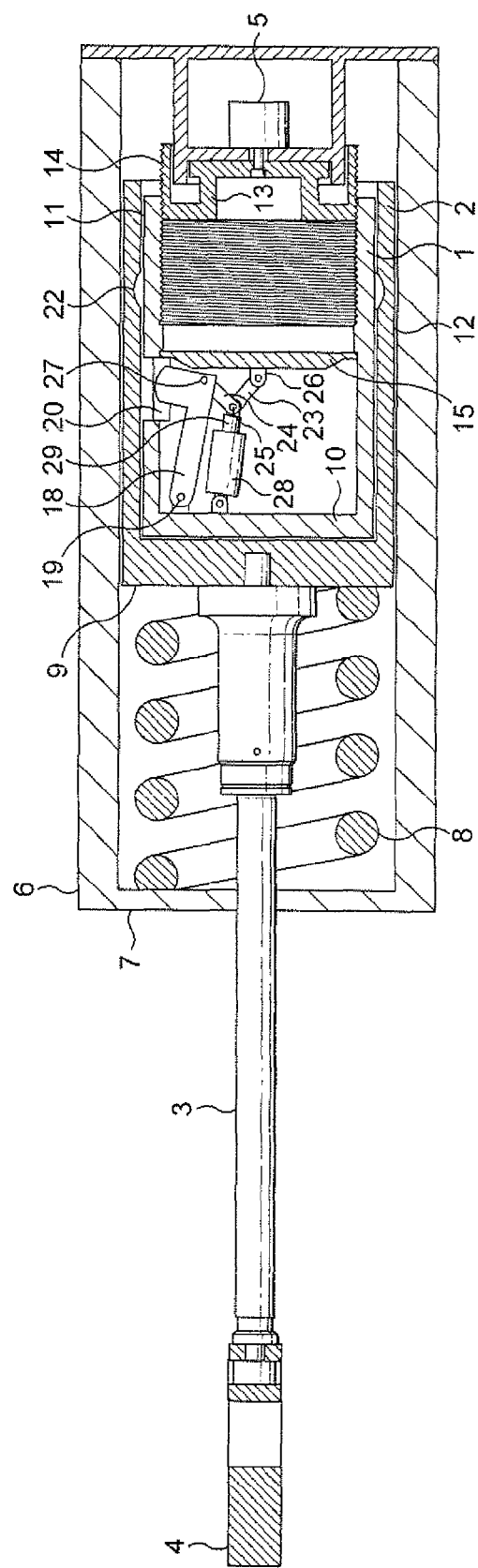
FIG. 2 shows in longitudinal section the exemplary actuator in a pre-determined failure mode.

FIG. 2 shows the actuator in its pre-determined failure mode (which might colloquially, though not necessarily, properly be termed a 'fail-safe' state), on the assumption that there has been an electrical power failure. The solenoid 28 is de-energized and owing to the forced retraction of its armature the toggle linkage 23, 24 has collapsed, causing disengagement of the detent arm 18 from the slot 22. Accordingly, the second carrier 2 can move downwardly under the force of the return mover (the spring 8) so that the control valve is de-actuated (e.g., closed).

In this example the carrier 1 will have to be moved downwards by the prime mover 5 before normal operation may be resumed.

The construction is very compact. The first carrier 1 is partly contained within the second carrier 2 and itself contains substantially all the parts of the detent mechanism and the toggle mechanism.

The invention claimed is:

1. An actuator comprising:
    a first carrier and a second carrier which are each moveable in a common direction;
    a detent engageable to couple the carriers to move in unison including a pivoted arm disposed on the first carrier and positioned to engage a part of the second carrier;
    a toggle linkage extensible to operate the detent and collapsible to release the detent, to allow movement of the second carrier relative to the first carrier, the toggle linkage including a pair of relatively pivoted links connected between a pivot on the first carrier and a pivot on said arm;
    an electrically operated actuating device for causing extension of the toggle linkage when energized and effecting collapse of the toggle linkage when de-energized; an operating member carried by the second carrier;
    a prime mover for the first carrier; and
    a return mover for causing return movement of the second carrier on the release of the detent,
    wherein the electrically-operated actuating device comprises a solenoid having an armature which is coupled to a pivot between the links and has a restoring bias.

2. The actuator of claim 1 in which the return mover comprises a mechanical spring.

3. The actuator of claim 2 in which the second carrier is generally cylindrical and partially contains the first carrier.

4. The actuator of 3 in which said mechanical spring is disposed to engage an end wall of the second carrier.

5. The actuator of claim 4 in which the first carrier is generally cylindrical in form.

6. The actuator of claim 5 in which the prime mover comprises an electric motor.

7. The actuator of claim 6 in which the motor is coupled to drive the first carrier by way of a threading on a cylindrical side wall of the first carrier.

8. An actuator comprising:
    a first carrier and a second carrier which are each moveable in a common direction;
    a detent engageable to couple the carriers to move in unison;
    a toggle linkage extensible to operate the detent and collapsible to release the detent, to allow movement of the second carrier relative to the first carrier;
    an electrically operated actuating device for causing extension of the toggle linkage when energized and effecting collapse of the toggle linkage when de-energized;
    an operating member carried by the second carrier, said operating member carrying a valve gate;
    an electric motor for driving the first carrier; and
    a mechanical spring for causing return movement of the second carrier on the release of the detent,
    wherein the detent comprises a pivoted arm disposed on the first carrier and positioned to engage a part of the second carrier; and
    the toggle linkage comprises a pair of relatively pivoted links connected between a pivot on the first carrier and a pivot on said arm.

9. The actuator of claim 8 in which the electrically-operated actuating device comprises a solenoid having an armature which is coupled to a pivot between said links and has a restoring bias.

10. An actuator comprising:
    a first carrier and a second carrier which are each moveable in a common direction, said second carrier being generally cylindrical and partially containing the first carrier;
    a detent engageable to couple the carriers to move in unison, the detent comprises a pivoted arm disposed on the first carrier and positioned to engage a slot in a cylindrical side wall of the second carrier;
    a toggle linkage extensible to operate the detent and collapsible to release the detent, to allow movement of the second carrier relative to the first carrier;
    an electrically operated actuating device for causing extension of the toggle linkage when energized and effecting collapse of the toggle linkage when de-energized;
    an operating member carried by the second carrier;
    a prime mover for the first carrier; and
    a return mover comprising a mechanical spring for causing return movement of the second carrier on the release of the detent,
    wherein the prime mover comprises an electric motor.

11. The actuator of claim 10 in which the electric motor is coupled to drive the first carrier by way of a threading on the first carrier.

12. The actuator of claim 10 in which said operating member includes a valve gate.

\* \* \* \* \*